Dec. 25, 1951 W. E. RENICK 2,580,128
PILOT UNIT FOR RELIEF VALVES
Filed March 28, 1947 3 Sheets-Sheet 1

INVENTOR.
WENDELL E. RENICK
BY
Herschel C. Omohundro
attorney

Dec. 25, 1951 W. E. RENICK 2,580,128
PILOT UNIT FOR RELIEF VALVES
Filed March 28, 1947 3 Sheets-Sheet 2

INVENTOR.
WENDELL E. RENICK
BY
Herschel C. Omohundro
attorney

INVENTOR.
WENDELL E. RENICK

Patented Dec. 25, 1951

2,580,128

UNITED STATES PATENT OFFICE 2,580,128

PILOT UNIT FOR RELIEF VALVES

Wendell E. Renick, Grove City, Ohio, assignor to The Denison Engineering Company, Columbus, Ohio, a corporation of Ohio Application March 28, 1947, Serial No. 737,983

4 Claims. (Cl. 137—53)

This invention relates generally to hydraulic apparatus and is more particularly directed to a pilot unit for a relief valve for use in a hydraulic system to prevent the pressures therein from exceeding a predetermined maximum.

One of the objects of the present invention is to provide a pilot unit for a relief valve which will operate to vent fluid pressure to the reservoir of a hydraulic system when the pressure in such system reaches a predetermined value, the valve being so formed that the pressure at which fluid venting commences will be only slightly less than the pressure which it is desired to maintain in the system.

In conventional relief valves, mechanism is usually provided to resist the flow of fluid to the reservoir until a predetermined pressure is reached but the flow from the valve generally starts before the desired pressure is reached and gradually increases as such pressure is approached until at the time the pressure is reached all the fluid supplied to the valve beyond that necessary to maintain the pressure is bypassed directly to the reservoir.

One of the objects of this invention is to provide a pilot unit for a relief valve in which the range from the point at which fluid flow to the reservoir is initiated until the valve fully opens will be kept at a minimum.

Another object of this invention is to provide a pilot unit for a relief valve having a main valve and an auxiliary valve which is responsive to the fluid pressure in the system to effect the operation of the main valve, a mechanism being provided to cause the auxiliary valve to operate more quickly, thereby permitting the use of a relatively slow operating valve which will delay the initial opening period until the desired pressure is approached, then suddenly open to prevent the desired pressure from being exceeded.

A further object of the invention is to provide a pilot unit for a relief valve having a substantially balanced main valve, an auxiliary valve which is responsive to pressure to create pressure differentials employed to actuate the main valve, and an actuating member for the auxiliary valve which actuating member is ineffective until fluid flow is initiated through the auxiliary valve, the actuating member also being responsive to pressure differentials.

A further object of the invention is to provide a pilot unit for a relief valve having a piston-type main valve at the opposite ends of which equal pressures are normally maintained, a relief valve having means for creating pressure differentials at opposite ends of the piston valve to effect the operation thereof, a differential creating mechanism including a resiliently closed auxiliary valve and an actuating piston therefor which piston is exposed to equal pressures at opposite ends when the auxiliary valve is closed and to pressure differentials which serve to move the piston toward the auxiliary valve when the latter is open sufficiently to permit pressure to fall on the upstream side thereof.

A still further object of the invention is to provide a pilot unit for a relief valve having a main valve with an operating piston which is provided with surface areas on opposite ends exposed to substantially equal pressures when the valve is closed, one surface area being slightly greater than the other so that the valve will be biased toward a closed position, the valve also being provided with an auxiliary valve and an actuating piston therefor, such piston being of an area greater than the relief valve, the proportion of the areas of the auxiliary valve and actuating piston being substantially the same as the proportion of the areas at opposite ends of the piston for actuating the main valve.

Another object is to provide a pilot unit for a relief valve having a body with a cylindrical chamber and a valve seat between the chamber and an outer port, the relief valve also being provided with a valve for engaging said seat and a piston for actuating such valve the piston dividing the chamber into a pair of sections which are connected by a reduced passage whereby equal pressures will normally be maintained in both sections. The relief valve is further provided with a passage extending from one of the sections of the chamber to the outlet port, this passage being provided with a pressure responsive auxiliary valve. The relief valve being further provided with a piston in registration with the auxiliary valve, such piston being exposed to the pressures maintained in the sections of the chamber, the piston being responsive to pressures which tend to urge the auxiliary valve from closed to open position and to maintain the valve in the open position until pressures in the chamber sections are substantially equalized.

Other objects and advantages of the present invention will be apparent from the following description, reference being had to the accompanying drawings wherein a preferred form of embodiment of the invention is clearly shown.

Figure 1:
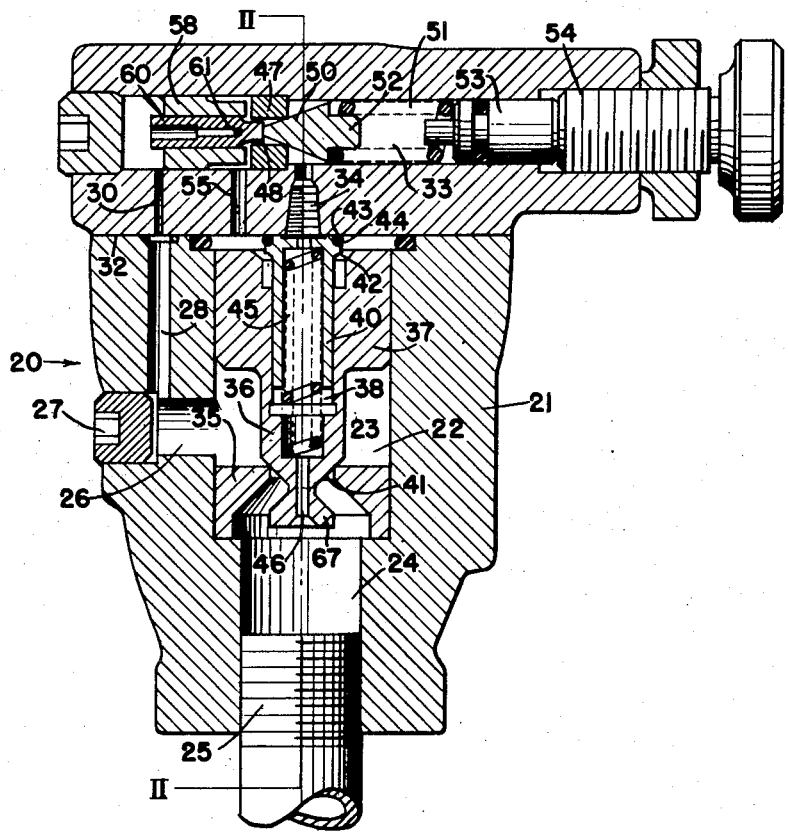
Fig. 1 is a vertical longitudinal sectional view taken through a relief valve formed in accordance with the present invention.

Referring more particularly to the drawings, the relief valve forming the subject matter of the invention is designated generally by the numeral 20, this valve includes a body 21 of generally cross-shaped configuration when viewed from either side, the body being provided with a central bore 22, a transverse passage 23 intersecting such bore and a vertical passage 24 constituting an extension of the bore 22. The outer ends of the passages 23 and 24 are threaded as at 25 for the purpose of connecting the relief valve 20 in a hydraulic system, the passage 23 being connected with the pressure section of the hydraulic system while the passage 24 is connected with the reservoir or a portion of the system leading thereto. The body 21 is also provided with a second lateral passage 26 closed at its outer end by a plug 27, the passage 26 communicating with a reduced vertical passage 28 which extends to the upper end of the body. This vertical passage communicates with a similarly extending reduced passage 30 formed in a cap member 31, secured by suitable means to the upper end of the body.

This cap 31 has a flat bottom wall 32 which closes the open upper end of the bore 22 when the cap and the body are in assembled relationship. The passage 30 communicates at its upper end with a bore 33 extending transversely through the cap 31. This bore is also connected with another vertical passage 34 which substantially registers with the axis of the bore 22. Before the cap 31 is applied to the body 21 in the manufacture of the valve, a valve seat insert 35 is pressed into the bore 22, this valve seat engaging a shoulder between the lower end of the bore 22 and the passage 24. To prevent the flow of fluid from the bore 22, which bore forms a chamber in the body, a poppet valve member 36 is provided for engagement with the valve seat 35. This poppet valve forms a part of a piston body 37 which is slidably received in the bore 22 above the transverse passage 23. The piston 37 divides the bore or chamber 22 into upper and lower sections, the latter being in constant communication with the high pressure section of a hydraulic system through the passage 23. Piston 37 is formed with a longitudinally extending bore 38 for the slidable reception of a balancing piston 40 which is slightly smaller in diameter than the opening 41 in the valve seat 35. Balancing piston 40 has a small flange 42 projecting outwardly therefrom at the upper end, this flange being grooved as at 43 for the reception of an O ring 44, the groove being so located that one side of the ring will normally project a short distance beyond the end of the piston. The piston 40, as well as the piston 37, is formed with an internal socket for the reception of a compression type coil spring 45 which tends to urge the balancing piston into engagement with the bottom wall of the cap 31 and the valve 36 into engagement with the seat 35. Piston 37 also has a central opening 46 which establishes communication between the passage 34 and the outlet passage 24.

Between the passages 30 and 34 in the cap 31 there is disposed a second valve seat 47 which is provided with an opening 48. The seat 47 is engaged by a cone-pointed valve 50 which is urged toward the seat by a coil spring 51, this spring being positioned between the valve 50 and a spring abutment 53, the latter being in turn engaged by an adjusting screw 54. When the valve 50 is engaged with the seat 47 communication between the passages 30 and 34 is interrupted. The cap section 31 is provided with another passage 55 which extends from the bore 33 to the chamber 22. This passage establishes limited communication between the sections of the chamber 22 remote from the valve seat and the bore 33 between the points of communication of the passages 30 and 55; the bore 33 is also provided with a guide 58 for the slidable reception of an elongated piston 60. In the form of the invention shown, this piston is formed with a longitudinal opening terminating at one end in a transverse opening 61. These openings establish limited communication between the sections of the bore 33 at opposite ends of the piston 60, the passages 28 and 30, the openings in the piston 60 and the passage 55 establishing limited communication between the sections of the chamber 22 at opposite ends of the piston 37. Thus, when fluid under pressure is introduced to the chamber 22 through the passage 23 some fluid will flow to the section of the chamber 22 above the piston to cause the pressure in this section of the chamber to equal the pressure in the section adjacent the valve seat, this condition being maintained as long as valve 50 is held in engagement with the second valve seat 47.

Due to the construction shown and described, the fluid pressure in the bore 33 between the valve 50 and the piston 60 will be the same as the pressure in the hydraulic system while valve 50 remains closed, the pressure in the bore 33 on the side of the seat 47 occupied by such valve being the same as the pressure in the reservoir. It will thus be seen that as the pressure rises in the system, valve 50 will be subjected to such pressure which will tend to move the valve toward an open position in opposition to the spring 51. The area of the valve 50 exposed to such pressure will be equal to the area of the opening 48 in the valve seat 47. This area is slightly less than the cross-sectional area of the piston 60. Due to the establishment of limited communication between the opposite ends of the piston 60, this member will be exposed to substantially equal pressures at opposite ends and there will be no tendency for this member to move as long as such balanced pressures are maintained. It has been found that desirable results may be secured when the ratio between the cross-sectional areas of the piston 60 and the opening 48 in the seat 47 is substantially equal to the ratio of the cross-sectional areas of the opening 41 in the valve seat 35 and the balancing piston 40.

In the operation of the valve, fluid pressure is introduced in the chamber 22 through passage 23. Some of this fluid flows through passages 28 and 30 to bore 33 through the openings in the piston 60 and through passage 55 to the upper end of the chamber 22 above piston 37. As the pressure rises on this fluid the force tending to move valve 50 from seat 47 will increase. When this force is sufficient to overcome the force of spring 51 fluid will commence to flow past valve 50 and through passage 34 and the interior of pistons 40 and 37 to the exhaust passage 24. When such flow starts to exceed the possible flow through the orifice 61 fluid pressure between seat 47 and guide 58 will fall. This action will cause a pressure differential at opposite ends of the piston 60 which pressure differential will cause piston 60 to move toward valve seat 47, the end of the piston engaging valve 50 to move the same farther away from seat 47. By opening valve 50 in this manner fluid pressure in passage 55 and the upper end of chamber 22 will be permitted to fall creating a pressure differential at opposite ends of the piston 37, the higher pressure existing at the lower end of the piston. This higher pressure will urge the piston in an upward direction causing valve 36 to move away from seat 35 to permit fluid to flow directly from chamber 22 into exhaust passage 24.

When sufficient fluid passes to the outlet port in this manner fluid pressure at opposite ends of the piston 60 will become equalized and the piston will then have no further effect on valve 50. At this time also the force of the fluid applied to valve 50 will be insufficient to hold the same open against the action of spring 51 and valve 50 will close, cutting off the flow of fluid from the upper end of chamber 22. Fluid pressure in this region will quickly build up to that in the lower end of the chamber, and piston 37 will be biased in downward direction by the spring 45 and the fluid pressure applied to the difference in areas of the upper and lower ends of the piston 37. When the piston 37 moves downwardly, valve 36 will engage seat 35 to prevent further flow of fluid from chamber 22 to the exhaust port.

Through the provision of the piston 60 for actuating the auxiliary valve 50 and the maintenance of substantially equal pressures at opposite ends of this piston a stronger spring may be employed to retain the auxiliary valve in a closed position since the actuating piston will quickly respond to pressure variations due to fluid flow past valve 50 to effect a wider opening of such valve after fluid flow has once been initiated. Through the provision of the restricted passages, piston 37 is prevented from moving in response to sudden pressure variations or shocks in the hydraulic system and a smoother action of the relief valve is thus secured.

Figure 2:
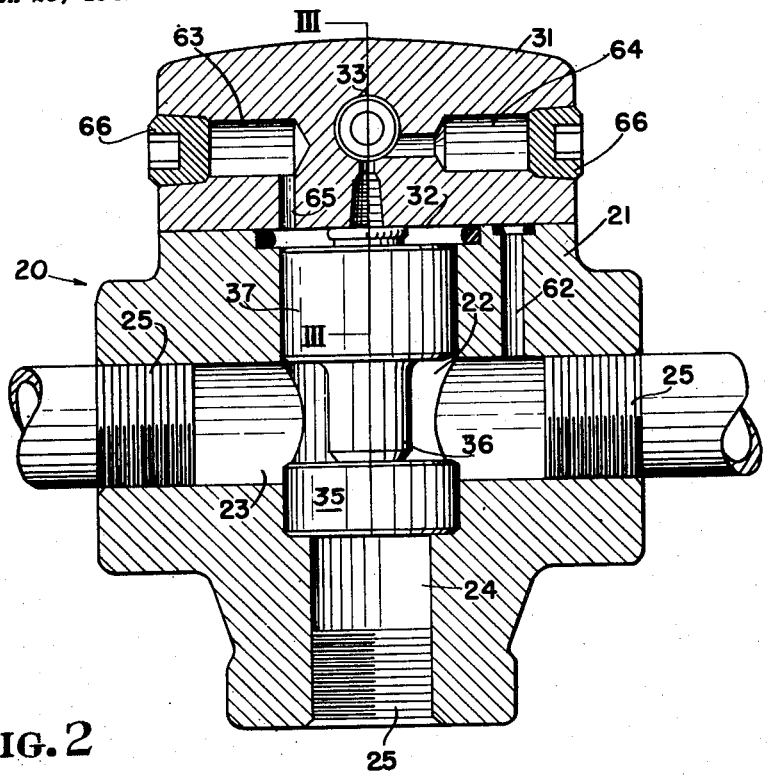
Fig. 2 is a vertical transverse sectional view taken through the valve shown in Fig. 1 on the plane indicated by the line II—II of Fig. 1.
Figure 3:
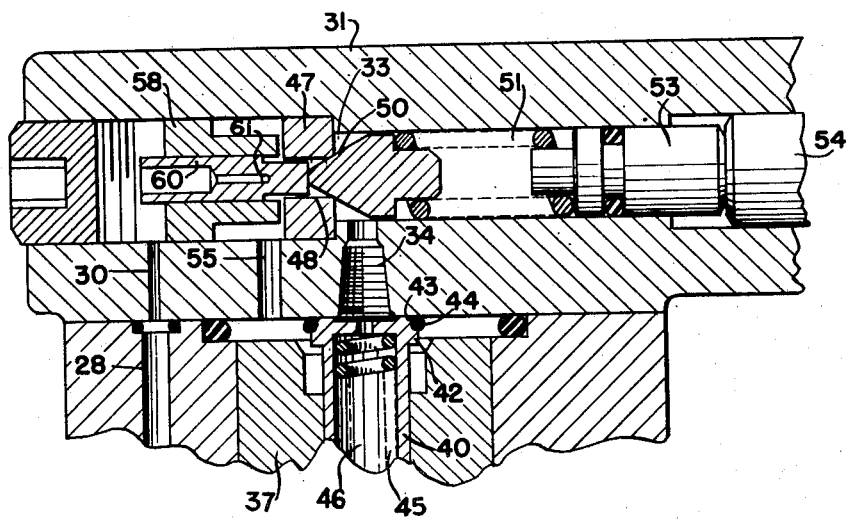
Fig. 3 is a detailed vertical sectional view on an enlarged scale taken through the valve on the plane indicated by the line III—III of Fig. 2.
Figure 4:
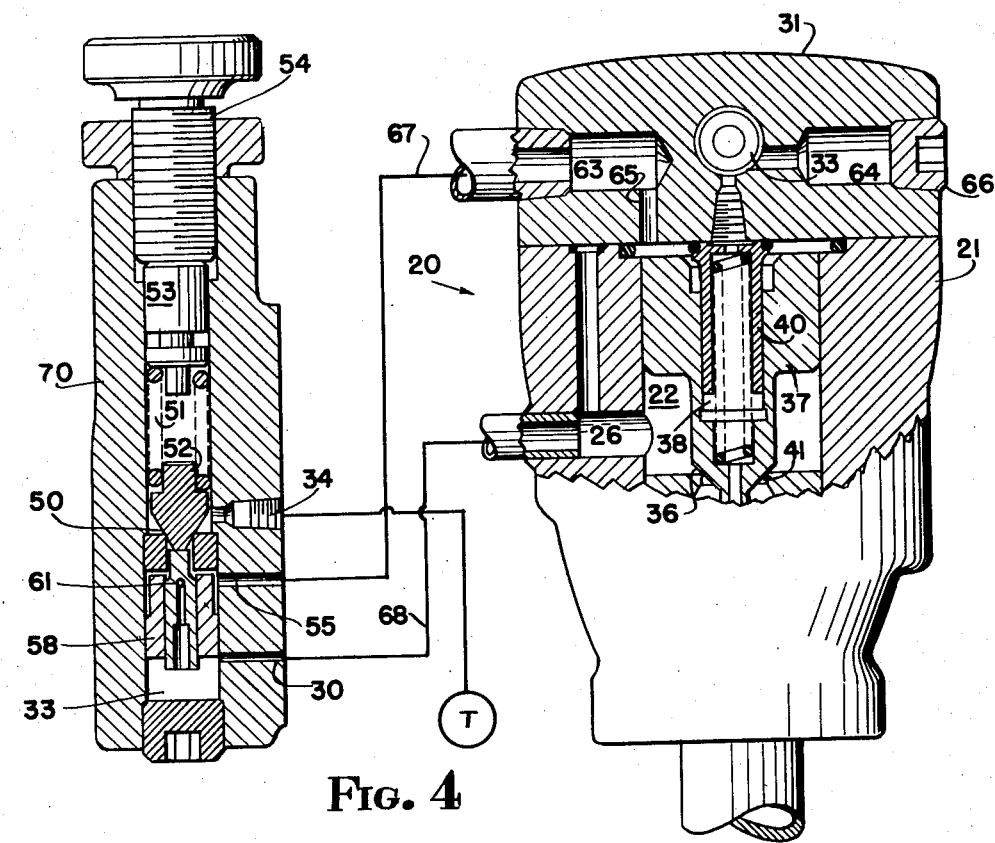
Fig. 4 is a diagrammatic view illustrating a portion of a hydraulic system employed to control the operation of the relief valve from a remote station.

It will be noted from Figure 2 that body 21 is formed with a vertical passage 62 which will permit the cover section 31 to be rotated through an angle of 90° and secured to the body in the event it is desired to arrange the control screw 54 at right angles to the position shown. Also from Fig. 2 it will be noted that the cover section 31 is provided with a lateral bore 63 which connects at its inner end with a passage 65 leading to the upper end of chamber 22. Bore 63 is normally closed at the outer end by a plug 66. It is provided to permit the relief valve to be controlled from a remote location. Fig. 4 illustrates a circuit by which the valve may be so controlled. In this circuit a second cover section 70 identical with the section 31 is disposed at the point of control and a fluid line 67 is extended from bore 63 to the passage 55 of the second cover section 70. Another fluid line 68 is connected at its ends with the passage 26 in body 21 and the end of bore 33 in cover section 70. The passage 34 of this cover section is connected with exhaust.

With the arrangement shown in Fig. 4 the operation of the relief valve may be controlled from the remote station as long as it is desired to cause the valve to by-pass fluid at pressures under that for which the adjusting screw 54 in the first cover section 31 has been set. When the circuit shown in Fig. 4 is employed, the cover section 70 will regulate the operation of the relief valve as long as the control screw 54 thereof is adjusted for pressures under that at which the screw 54 of cover section 31 is set. If it is desired to regulate the valve with the cover section 31 the screw 54 of section 70 is set at a pressure above that desired and screw 54 of section 31 set at the desired pressure.

Figure 5:
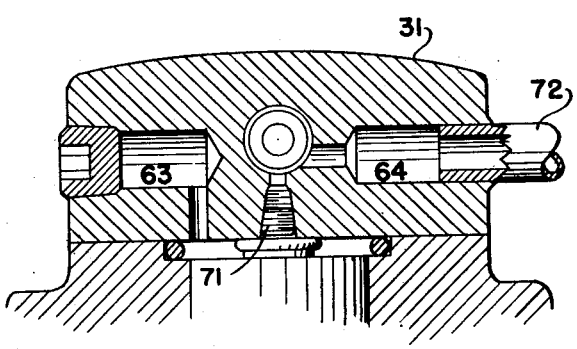
Fig. 5 is a vertical transverse sectional view of a portion of the relief valve illustrating the same set up for operation as a sequence valve.

Valve 20 is particularly applicable for use as a sequence valve. It is adapted as shown in Fig. 5, to such use by removing cover section 31, inserting a plug 71 in passage 34 and replacing the cover section on the body. Plug 66 is removed from a lateral passage 64 which connects at its inner end with bore 33 at the outlet side of valve seat 47 and an exhaust line 72 inserted. With such an arrangement, port 24 may be connected with a portion of a hydraulic system containing pressure and valve 36 will operate to connect chamber 22 with such portion of the hydraulic system when a predetermined pressure in chamber 22 is attained. The pressure in port 24 will not affect the opening and closing of valve 36.

To improve the operation of the relief valve by eliminating the tendency of the oil being bypassed to exhaust to foam, the valve 36 has a head 67 provided at its lower end, this head extending through the opening 41 in the seat 35. Head 67 is substantially equal in diameter to the opening 41 and has its upper surface of frusto-conical form so that oil flowing through the opening 41 will be guided in an outward and downward direction whereby the force will be dissipated before the oil reaches the reservoir. It will be noted from Figure 1 that the upper surface of the head 67 is inclined in a manner similar to the under surface of the seat 35. A gradually increasing annular passage is thus provided which will obviously dissipate the pressure of the fluid without creating appreciable disturbance. After the fluid passes the head 67 it combines to form a solid stream flowing from the outlet port. This construction of the seat and head forms the subject matter of copending application Serial No. 737,985 filed on even date herewith.

The manner in which the balancing piston is constructed is also quite novel and due to this construction some manufacturing difficulties have been eliminated. In previous valves of this type the piston had an extension which projected into a socket formed in the cover section. In such a construction it is essential to have the chambers for the sections of the piston in concentric relationship and the piston sections themselves must also be so ground. With the construction shown in Fig. 1, it is not essential to have the socket in the piston concentric with the periphery thereof since the upper end of the piston may engage the smooth bottom wall of the cover at a variety of points without affecting the operation of the device. This balancing piston construction forms the subject matter of copending application Serial No. 737,984 filed on even date herewith.

I claim:

1. A pilot unit for a relief valve of the type having an inlet for pressure fluid, an exhaust, a piston valve between said inlet and exhaust, and a control chamber at the opposite end of the piston from said inlet, said pilot unit comprising a body with a chamber communicating at spaced points with said inlet and said control chamber and having substantially unrestricted communication with said exhaust; a valve seat in said chamber between the points of communication thereof with said control chamber and exhaust; valve means resiliently urged toward said valve seat, from the side thereof communicating with exhaust, said valve means presenting a uniform area to action of pressure fluid when in both open and closed condition; piston means disposed for movement in said chamber between the points of communication thereof with said control chamber and said inlet; and passage means continually establishing restricted communication between the sections of said chamber at the ends of said piston means.

2. A pilot unit for a relief valve of the type having an inlet for pressure fluid, an exhaust, a piston valve between said inlet and exhaust and a control chamber at the opposite end of the piston from said inlet, said pilot unit comprising a body with a chamber communicating at spaced points with said inlet and said control chamber and having substantially unrestricted communication with said exhaust; a valve seat in said chamber between the points of communication thereof with said control chamber and exhaust; a cone-shaped valve yieldably engaged with said seat on the side nearest said exhaust; a piston of greater cross-sectional area than the opening in said valve seat disposed for movement in said chamber between the points of communication thereof with said control chamber and said inlet; and passage means continually establishing restricted communication between the sections of said chamber at the ends of said piston.

3. A pilot unit for a relief valve of the type having an inlet for pressure fluid, an exhaust, a piston valve between said inlet and exhaust and a control chamber at the opposite end of the piston from said inlet, said pilot unit comprising a body with a chamber communicating at spaced points with said inlet and said control chamber and having substantially unrestricted communication with said exhaust; a valve seat in said chamber between the points of communication thereof with said control chamber and exhaust; a cone-shaped valve disposed in said chamber at the side of said seat communicating with exhaust; a spring urging said valve toward said seat; a piston supported for movement in said chamber between the points of connection thereof with said control chamber and said inlet, said piston engaging the end of said cone-shaped valve and having a cross-sectional area slightly greater than the opening in said valve seat; and a continually open restricted passage establishing communication between the sections of said chamber at the ends of said piston.

4. A pilot unit for a relief valve of the type having an inlet for pressure fluid, an exhaust, a piston valve between said inlet and exhaust and a control chamber at the opposite end of the piston from said inlet, said pilot unit comprising a body with a longitudinally extending bore and lateral passages spaced along said bore one pasage communicating with said inlet, another passage communicating with said control chamber and another openly communicating with said exhaust; guide means in said bore between the passages leading to the inlet and said control chamber; a valve seat insert in said bore between the passages leading to the control chamber and said exhaust, the seat on said insert being on the side adjacent the passage leading to exhaust; a spring-pressed conical valve engaging said seat the end of said valve projecting partially through said insert; a pusher piston movably disposed in said guide; and an orifice formed in said piston and establishing continuous restricted communication between the portions of said bore at opposite ends of said guide.

WENDELL E. RENICK.

REFERENCES CITED

The following references are of record in the file of this patent:

UNITED STATES PATENTS

| Number | Name | Date |
| --- | --- | --- |
| 2,158,478 | Parker | May 16, 1939 |
| 2,239,657 | Stadlin | Apr. 22, 1941 |
| 2,308,753 | Hart | Jan. 19, 1943 |

FOREIGN PATENTS

| Number | Country | Date |
| --- | --- | --- |
| 251,925 | Great Britain | May 13, 1926 |
| 267,978 | Great Britain | June 23, 1927 |
| 353,107 | Great Britain | July 23, 1931 |